(12) United States Patent
Das

(10) Patent No.: US 7,496,894 B2
(45) Date of Patent: Feb. 24, 2009

(54) METHODS FOR ENHANCING POINTER ANALYSES

(75) Inventor: Manuvir Das, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 778 days.

(21) Appl. No.: 10/866,941

(22) Filed: Jun. 14, 2004

(65) Prior Publication Data

US 2004/0243980 A1    Dec. 2, 2004

Related U.S. Application Data

(62) Division of application No. 09/489,878, filed on Jan. 21, 2000, now Pat. No. 7,003,760.

(51) Int. Cl.
*G06F 9/45*    (2006.01)
(52) U.S. Cl. .................. 717/124; 717/151; 717/154; 717/155; 717/156
(58) Field of Classification Search ................ None
See application file for complete search history.

(56) References Cited

U.S. PATENT DOCUMENTS 6,014,518 A * 1/2000 Steensgaard ................ 717/154
6,072,950 A * 6/2000 Steensgaard ................ 717/126
7,003,760 B1 * 2/2006 Das .............................. 717/124
2004/0003382 A1 * 1/2004 Steensgaard ................ 717/154

OTHER PUBLICATIONS

Bjarne Steensgaard, "Points-to Analysis in Almost Linear Time", 1996, ACM, pp. 32-41.*
Manuvir Das, "Unification-based Pointer Analysis with Directional Assignments", 2000 ACM, pp. 1-12.*

* cited by examiner

Primary Examiner—Eric B Kiss
Assistant Examiner—Ben C Wang
(74) Attorney, Agent, or Firm—Merchant & Gould, P.C.

(57) ABSTRACT

Methods are described that enhance pointer analysis for programs. Whereas previous methods are constrained by the extremes of an inverse relationship between time and information, the present methods selectively unify information so as to allow a desired level of analytical decision within a desired duration of analysis. One aspect of the present invention includes selectively retaining information at a first order of indirection based on variables in an assignment statement while unifying information at subsequent orders of indirection. The methods are used for pointer variables, but are equally useful to function definitions, function calls, function pointers, indirect function calls, and others. The methods may be used in client analysis tools such as code browsers and slicing tools.

15 Claims, 11 Drawing Sheets

METHODS FOR ENHANCING POINTER ANALYSES

This application is a divisional of application Ser. No. 09/489,878, filed Jan. 21, 2000, now U.S. Pat. No. 7,003,760, which application is incorporated herein by reference.

TECHNICAL FIELD

The technical field relates generally to program analyses. More particularly, it pertains to the analysis of pointers in programs.

COPYRIGHT NOTICE—PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent files or records, but otherwise reserves all copyright rights whatsoever. The following notice applies to the software and data as described below and in the drawing attached hereto: Copyright © 1999, 2000, Microsoft Corporation, All Rights Reserved.

BACKGROUND

A program is a list of statements. This list of statements may be translated, through processes that include compilation, to produce an executable file that can cause a computer to perform a desired action. One type of statement is an assignment statement. An illustrative example of an assignment statement is x=y. This statement may be translated to mean that y is assigned to x, or more specifically, the value of the variable y is assigned to the variable x.

One type of variable is a pointer. Pointers are often used in programs because they offer flexibility in creating compact and efficient executable files. A pointer contains a location (or address) of another variable. Thus, a pointer points to another variable. Through a pointer, the value of another variable may be changed. In this way, a pointer indirectly references another variable.

It is beneficial to analyze programs in order to obtain information that may be used to improve them. In order to analyze a program that uses pointers, an analysis is performed that focuses on statements that involve pointers. Such pointer analysis yields sets of information about pointers in the program. The precision of a pointer analysis is determined by the size of these sets of information. The larger the set the less precise is the information.

Current pointer analyses suffer from the extremes of an inverse relationship between time and information. One type of analysis can be performed quickly by using a technique of unification but provides imprecise results due to the production of large sets of information. Another analysis by Lars Ole Andersen provides results that are much more precise by producing small sets of information but requires a prohibitively long amount of time. See Lars Ole Andersen, *Program Analysis and Specialization for the C Programing Language* (1994) (published Ph.D. dissertation, University of Copenhagen). Thus, current pointer analyses are either too costly in terms of time or too imprecise in terms of information. Tools that rely on such pointer analyses such as optimizer and debugging tools have been constrained by having to make inferior assumptions about behaviors of programs. As the size of programs has increased with each generation of technology, such inferior assumptions may slow the improvement of programs and lead to the eventual lack of acceptance of such programs in the marketplace.

Thus, what is needed are systems, methods, and structures to enhance pointer analysis of programs so as to allow a desired level of analytical precision within a desired duration of analysis.

SUMMARY

Systems, methods, and structures to support enhanced pointer analyses are described. An illustrative aspect includes a system for enhancing pointer analysis of a program. The program includes at least one source file. The system comprises a compiler to compile at least one source file to produce an intermediate language. The system further comprises a builder receptive to the intermediate language to build a tree that represents the source file. The system further comprises an analyzer to analyze the tree to produce an object file. The object file contains at least one relationship between two variables in an assignment statement in the program. The relationship defines that a set of symbols relating to one of the two variables is a subset of a set of symbols relating to the other of the two variables.

Another illustrative aspect includes a method of analyzing pointers in a program. The method includes processing an assignment statement of two variables, forming a relationship such as a label relationship between two locations related to the two variables, and enforcing the relationship. The duration of the acts of processing an assignment statement and forming a relationship are about linearly proportional to the size of the program in theory and in practice. The method includes delaying the act of enforcing the relationship to enable the method to process each assignment statement in the program. The act of enforcing the relationship includes moving label information to create the label relationship. In one embodiment, such act of enforcing is about quadratically proportional to the size of the program in theory and is about linearly proportional to the size of the program in practice. Factoring, sharing, and other suitable techniques can be used such that the act of enforcing is about linearly proportional to the size of the program.

Another illustrative aspect includes a method of analyzing pointers in a program. The method comprises forming a location for at least one variable in the program. The location includes a label and a content. The method further comprises forming a relationship between two locations upon an assignment of a first variable and a second variable in the program. The relationship defines that a label of one of the two locations is a subset of a label of the other of the two locations. The contents of the two locations are selectively unified. In one aspect the second variable is assigned to the first variable.

Another illustrative aspect includes a method of analyzing pointers in a program. The method comprises forming a location for at least one variable in the program. The location includes a label and a content. The method further comprises forming a relationship between two locations upon an assignment of a first variable and an address of a second variable in the program. The relationship defines that a label of one of the two locations is a subset of a label of the other of the two locations. The contents of the two locations are selectively unified. In one aspect, the address of the second variable is assigned to the first variable.

Another illustrative aspect includes a method of analyzing pointers in a program. The method comprises forming a location for at least one variable in the program. The location includes a label and a content. The method further comprises forming a relationship between two locations upon an assignment of a first variable and a dereference of a second variable in the program. The relationship defines that a label of one of the two locations is a subset of a label of the other of the two locations. The contents of the two locations are selectively unified. In one aspect, the dereference of the second variable is assigned to the first variable.

Another illustrative aspect includes a method of analyzing pointers in a program. The method comprises forming a location for at least one variable in the program. The location includes a label and a content. The method further comprises forming a relationship between two locations upon an assignment of a dereference of a first variable and a second variable in the program. The relationship defines that a label of one of the two locations is a subset of a label of the other of the two locations. The contents of the two locations are selectively unified. In one aspect, the second variable is assigned to the dereference of the first variable.

Another illustrative aspect includes a data structure to enhance pointer analysis in a program. The program includes at least one assignment statement of variables. The variable includes a name and a content. The data structure comprises a data member location and a data member flow to represent at least one label relationship. The data member location includes a data member label that includes at least one data member symbol, and a data member content that represents a content of the variable. The data member flow stores an address of another instantiation of the data structure if an assignment statement is defined for two variables, and the another instantiation of the data structure is related to one of the two variables.

DETAILED DESCRIPTION

Figure 1:
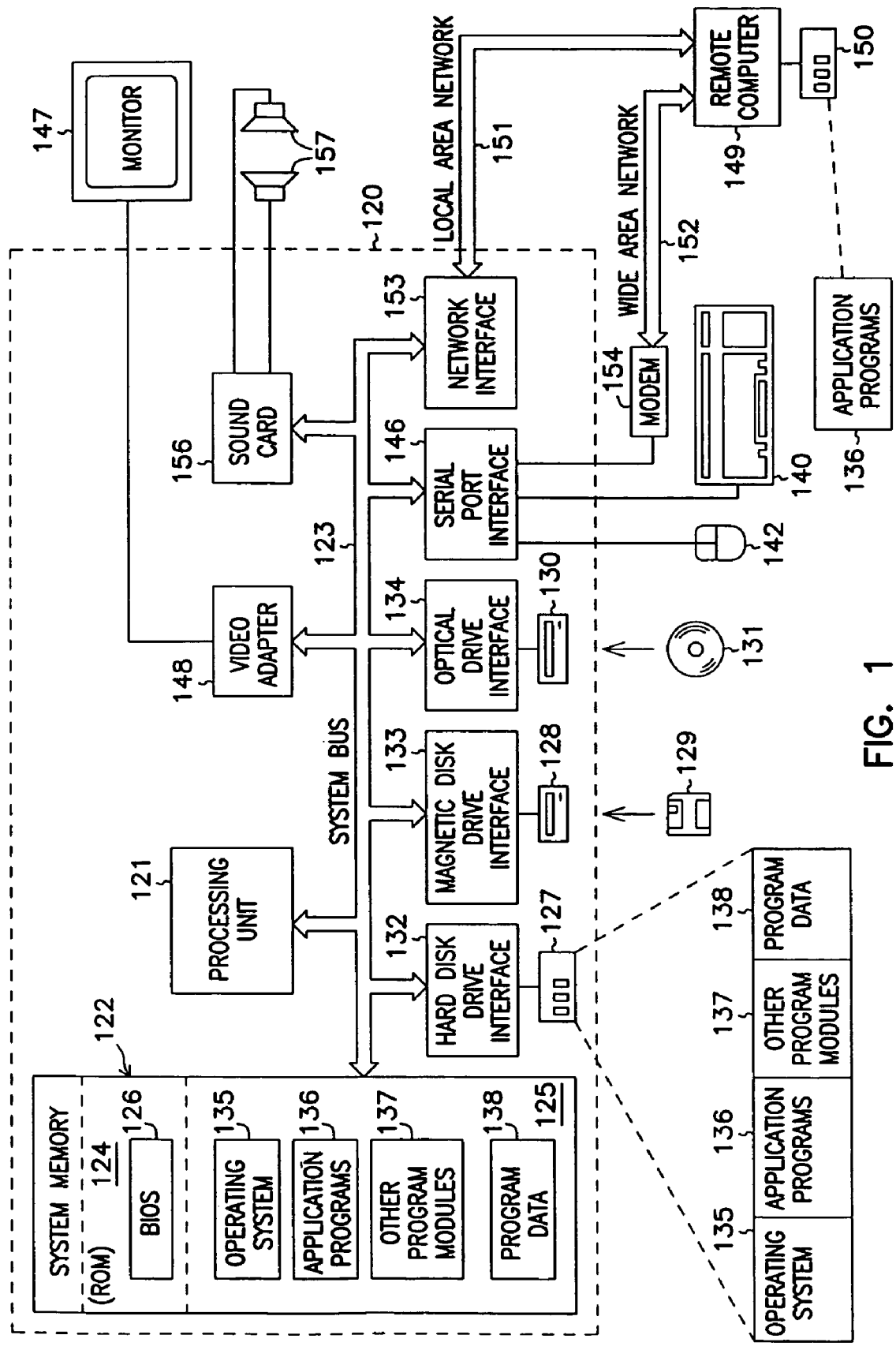
FIG. 1 is a block diagram of a system according to one aspect of the present invention.

In the following detailed description of exemplary embodiments of the invention, reference is made to the accompanying drawings which form a part hereof, and in which is shown, by way of illustration, specific exemplary embodiments in which the invention may be practiced. In the drawings, like numerals describe substantially similar components throughout the several views. These embodiments are described in sufficient detail to enable those skilled in the art to practice the invention. Other embodiments may be utilized and structural, logical, electrical, and other changes may be made without departing from the spirit or scope of the present invention. The following detailed description is, therefore, not to be taken in a limiting sense, and the scope of the present invention is defined only by the appended claims.

FIG. 1 is a block diagram of a system according to one aspect of the present invention. FIG. 1 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc., that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like which have multimedia capabilities. The invention may also be practiced in distributed computing environments where tasks are performed by remote processing devices linked through a communications network. In a distributed computing environment, program modules may be located in both local and remote memory storage devices.

FIG. 1 shows a general-purpose computing device in the form of a conventional personal computer 120, which includes processing unit 121, system memory 122, and system bus 123 that couples the system memory and other system components to processing unit 121. System bus 123 may be any of several types, including a memory bus or memory controller, a peripheral bus, and a local bus, and may use any of a variety of bus structures. System memory 122 includes read-only memory (ROM) 124 and random-access memory (RAM) 125. A basic input/output system (BIOS) 126, stored in ROM 124, contains the basic routines that transfer information between components of personal computer 120. BIOS 126 also contains start-up routines for the system. Personal computer 120 further includes hard disk drive 127 for reading from and writing to a hard disk (not shown), magnetic disk drive 128 for reading from and writing to a removable magnetic disk 129, and optical disk drive 130 for reading from and writing to a removable optical disk 131 such as a CD-ROM or other optical medium. Hard disk drive 127, magnetic disk drive 128, and optical disk drive 130 are connected to system bus 123 by a hard-disk drive interface 132, a magnetic-disk drive interface 133, and an optical-drive interface 134, respectively. The drives and their associated computer-readable media provide nonvolatile storage of computer-readable instructions, data structures, program modules, and other data for personal computer 120. Although the exemplary environment described herein employs a hard disk, a removable magnetic disk 129 and a removable optical disk 131, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 129, optical disk 131, ROM 124 and RAM 125. Program modules may include operating system 135, one or more application programs 136, other program modules 137, and program data 138. A user may enter commands and information into personal computer 120 through input devices such as a keyboard 140 and a pointing device 142. Other input devices (not shown) may include a microphone, joystick, game pad, satellite dish, scanner, or the like. These and other input devices are often connected to the processing unit 121 through a serial-port interface 146 coupled to system bus 123; but they may be connected through other interfaces not shown in FIG. 1, such as a parallel port, a game port, or a universal serial bus (USB). A monitor 147 or other display device also connects to system bus 123 via an interface such as a video adapter 148. In addition to the monitor, personal computers typically include other peripheral output devices such as a sound adapter 156, speakers 157, and further devices such as printers.

Personal computer 120 may operate in a networked environment using logical connections to one or more remote computers such as remote computer 149. Remote computer 149 may be another personal computer, a server, a router, a network PC, a peer device, or other common network node. It typically includes many or all of the components described above in connection with personal computer 120; however, only a storage device 150 is illustrated in FIG. 1. The logical connections depicted in FIG. 1 include local-area network (LAN) 151 and a wide-area network (WAN) 152. Such networking environments are commonplace in offices, enterprise-wide computer networks, intranets and the Internet.

When placed in a LAN networking environment, PC 120 connects to local network 151 through a network interface or adapter 153. When used in a WAN networking environment such as the Internet, PC 120 typically includes modem 154 or other means for establishing communications over network 152. Modem 154 may be internal or external to PC 120, and connects to system bus 123 via serial-port interface 146. In a networked environment, program modules, such as those comprising Microsoft® Word which are depicted as residing within PC 120 or portions thereof may be stored in remote storage device 150. Of course, the network connections shown are illustrative, and other means of establishing a communications link between the computers may be substituted.

Software may be designed using many different methods, including object-oriented programming methods. C++ is one example of common object-oriented computer programming languages that provides the functionality associated with object-oriented programming. Object-oriented programming methods provide a means to encapsulate data members (variables) and member functions (methods) that operate on that data into a single entity called a class. Object-oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object-oriented programming environment.

The embodiments of the present invention focus on enhancing pointer analyses. As mentioned hereinbefore, a program is a list of statements. Depending on the programming language, these statements can be especially expressive and may be classified into many different types. One type includes an assignment of a complicated expression such as "x=y+z*2". The embodiments of the present invention simplify these different types into four so as to ease the process of pointer analysis. These four types are discussed in more detail below.

Now, for illustrative purposes only, suppose one of the simplified four types of assignment statement is defined for the variables x and y in the program. Such an assignment statement causes the embodiments of the present invention to create a relationship between a location related to the variable x and a location related to the variable y. Without this relationship, a pointer analysis may be constrained by the extremes of the inverse relationship between time and information. This relationship allows a pointer analysis to selectively retain information for a desired analytical precision within a desired duration of analysis.

The terms "pointer" or "pointer type," hereinbefore and hereinafter, are understood to mean the inclusion of a pre-defined data type in a programming language. However, these terms include the type conversion that may occur automatically to variables in a program, or type casting that may occur by forcing variables in a program to hold values of a given type.

Figure 2A:
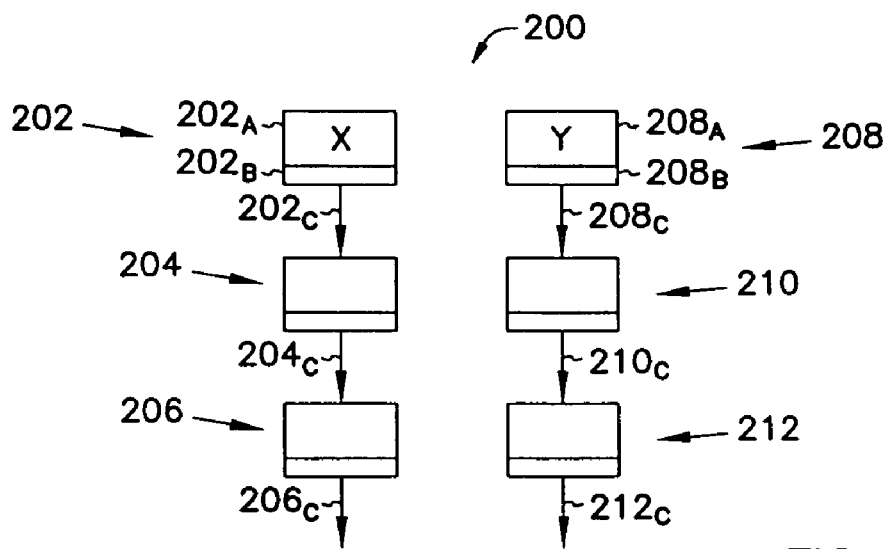
FIGS. 2A-2C illustrate a block diagram of a graph according to one aspect of the present invention.
Figure 2B:
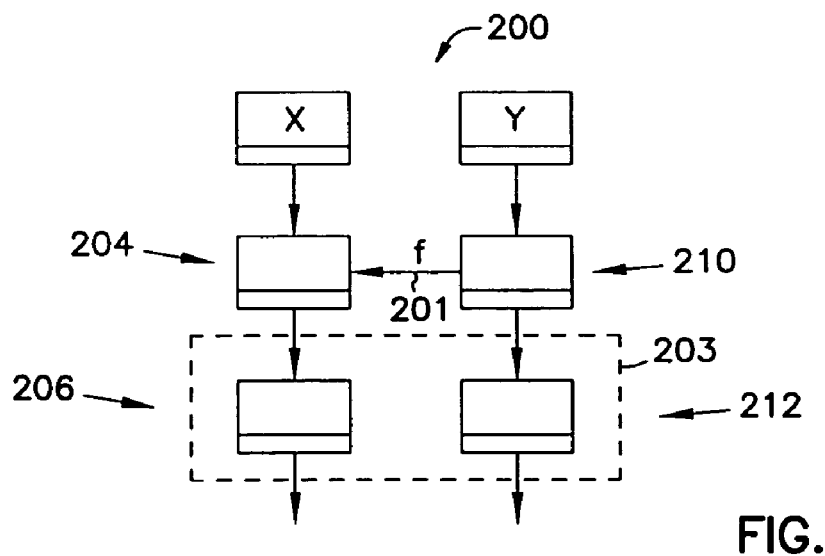
Figure 2C:
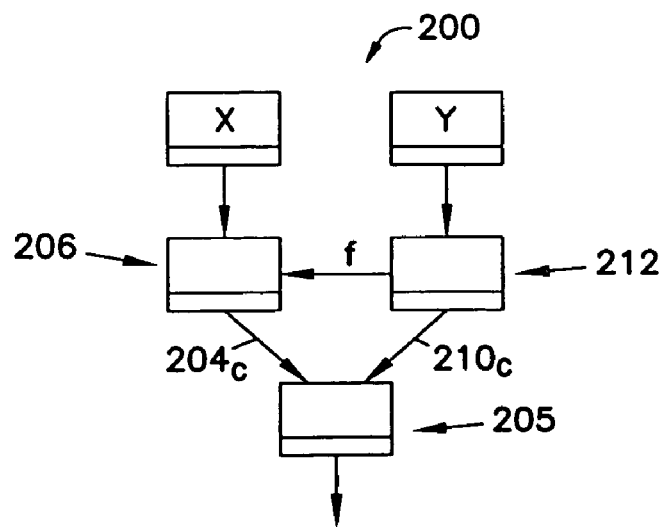

FIGS. 2A-2C illustrate a block diagram of a graph according to one aspect of the present invention. A number of nodes appear in the graph of FIGS. 2A-2C. A node graphically represents a location. The location represents a variable in a program in one embodiment. In another embodiment, the location is related to a variable through at least one pointer. The location includes a label and a content. The label contains at least one symbol. The term "symbol" is understood to mean the inclusion of a name or an identifier of a variable. The content contains a value. For illustrative purposes, suppose that a location A represents a pointer variable. Then, the content of the location A contains an address of another location, and for the sake of the illustration, this other location is a location B. A line graphically emanates from the content area of the node that represents the location A and graphically points to another node that represents the location B. The location B is also called the pointed-to location of the location A.

FIG. 2A shows a graph following the next sequence of processing. A graph 200 shows pointer relationships between various nodes before an assignment statement of interest is defined in a program. The graph 200 includes a node 202 that represents a variable x. The node 202 includes a label $202_A$ and a content $202_B$. The label $202_A$ contains a symbol x. A line $202_C$ shows that there is a pointer relationship between node 202 and node 204. Therefore, the node 202 represents a pointer variable x in the program, and the node 204 represents a pointed-to location of the variable x. In one embodiment, only one line can emanate from any single node to represent a pointer relationship with another node. A pointer relationship also exists between nodes 204 and 206 through a line $204_C$. In one embodiment, the node 204 represents a level of indirection, and the node 206, which is a pointed-to location of the node 204, represents another level. A line $206_C$ shows that there may be other pointer relationships related to the node 206.

The graph 200 also includes a node 208 that represents a variable y. The node 208 includes a label $208_A$ and a content $208_B$. The label $208_A$ contains a symbol y. A line $208_C$ shows a pointer relationship between nodes 208 and 210. Therefore, the node 208 represents a pointer variable y in the program, and the node 210 is a pointed-to location of the variable y. A line $210_C$ shows a pointer relationship between nodes 210 and 212. In one embodiment, the node 210 represents a level of indirection, and the node 212, which is a pointed-to location of the node 210, represents another level. A line $212_C$ shows a pointer relationship between nodes 212 and others (not shown).

Hereinafter, for clarity purposes, many of the reference numbers are eliminated from subsequent drawings so as to focus on the portion of interest of the graphs of the various figures.

FIG. 2B shows a graph following the next sequence of processing. For illustrative purposes, suppose the assignment statement defines that "x=y" in the program. In one embodiment, such an assignment statement creates the relationship between a pointed-to location of the variable x and a pointed-to location of the variable y. In one embodiment, the relationship defines that the label of the pointed-to location of the variable y is a subset of the label of the pointed-to location of the variable x. This subset is the information that can be selectively retained to achieve the desired analytical precision.

The graph 200 represents this relationship through a line 201. In one embodiment, the line 201 emanates from the node 210 to point to the node 204. In one embodiment, the line 201 is distinguished from other lines in the graph 200 by having an "f" appear above the line 201. The line 201 may be referred to as a flow line. In one embodiment, at least one flow line may emanate from any single node to show a label relationship. The direction of the line as shown by the arrowhead indicates that the label of the node 210 is a subset of the label of the node 204. In one embodiment, since the node 204 and the node 210 are in the same level of indirection, the line 201 defines a label relationship that is at the same level of indirection.

The assignment statement may cause a selective unification. The term "selective unification" means the unification of information, and whether such unification will take place is based on a decision by the user or the program. In one embodiment, the content of the pointed-to location of the variable x is selectively unified with the content of the pointed-to location of the variable y. The graph 200 represents this unification by including a marquee 203 around the node 206 and the node 212. The process of unification is discussed by Bjarne Steensgaard, *Points-to Analysis In Almost Linear Time*, Conference Record of the Twenty-Third ACM Symposium on Principles of Programming Languages, p. 32-41 (January 1996). Such process of unification does not limit the embodiments of the present invention, and as such, will not be presented here in full.

FIG. 2C shows a graph following the next sequence of processing. The graph 200, after the process of unification, includes a node 205. The node 205 represents the unification of the nodes 206 and 212. The content of the pointed-to location of the variable x, which is represented by the node 206, and the content of the pointed-to location of the variable y, which is represented by the node 212, contains the address of the location represented by the node 205. Thus, both lines $204_C$ and $210_C$ point to the node 205.

Figure 3:
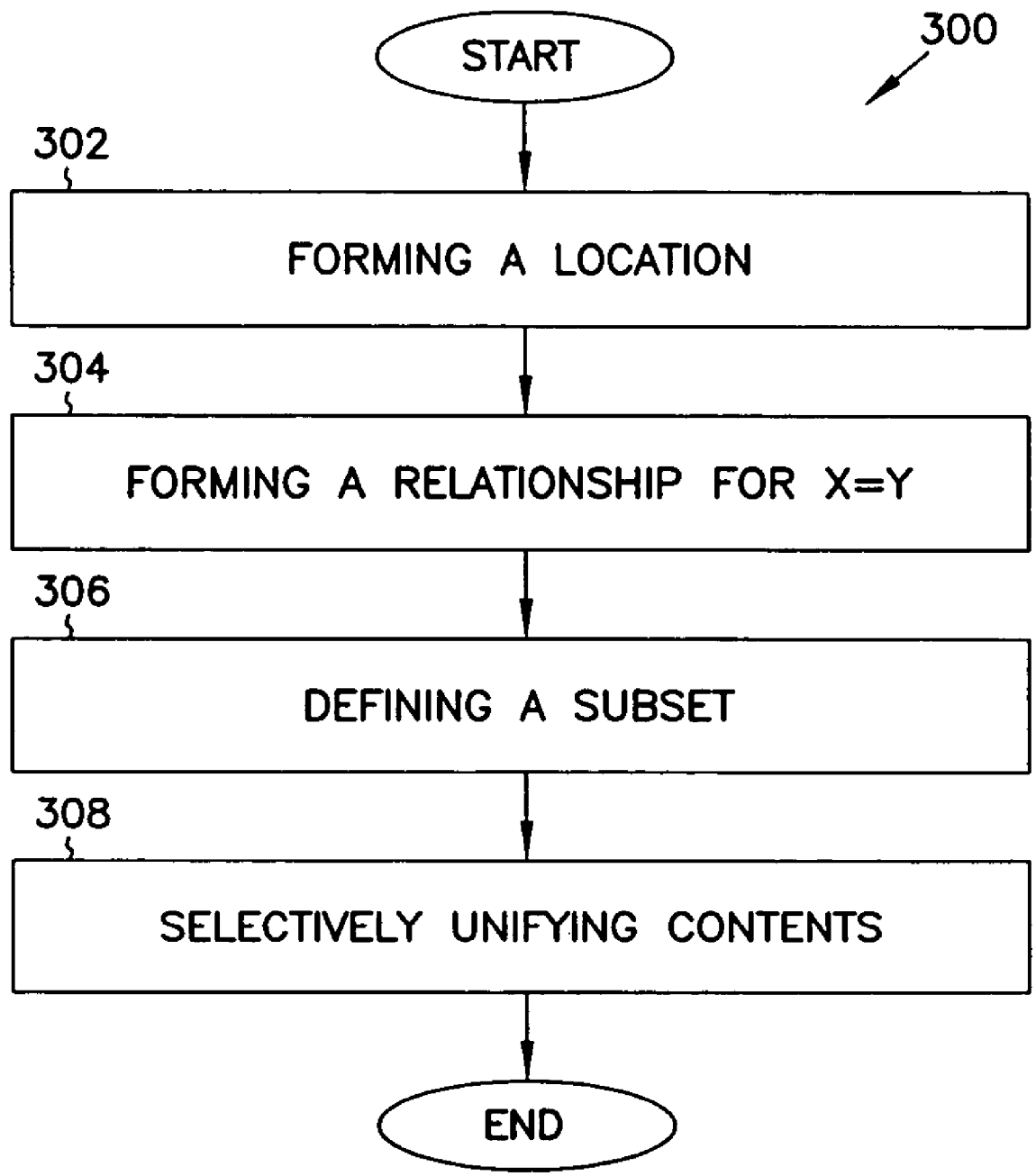
FIG. 3 is a process diagram of a method according to one aspect of the present invention.

FIG. 3 is a process diagram of a method according to one aspect of the present invention. A method 300 includes an act 302 for forming a location. The location includes a label and a content. The method 300 includes an act 304 for forming a relationship between two locations upon an assignment of two variables in a program. For illustrative purposes only, suppose that the assignment defines "x=y." The act 304 includes an act 306 for defining that a label of one of the two locations is a subset of a label of the other of the two locations. If the variables x and y are pointer variables, then the act 306 defines that the label of the pointed-to location of the variable y is a subset of the label of the pointed-to location of the variable x. The method 300 also includes an act 308 for selective unification of the contents of the two locations.

In another embodiment, the method 300 may be considered as a process for determining whether a program is well typed or correctly typed under a pointer analysis. This process uses a combination of set theory, sentential calculus, predicate calculus, and metalogic to express such determination. The domain of the determination includes:

$s \in$ Symbols
$\tau \in$ Locations ::= $((\phi, \alpha)$
$\phi \in$ Labels ::= $\{s_1, \ldots, s_n\}$
$\alpha \in$ Values ::= $\perp | \text{ptr}(\tau)$ Thus, s is an element of symbols, and the term "symbol" has been discussed hereinbefore. $\tau$ is an element of locations, and the term "location" has been discussed hereinbefore, but in this instance, the term "location" is expressed as including $\phi$ and $\alpha$. $\phi$ is an element of labels, and the term "label" has been discussed hereinbefore, but in this instance, the term "label" is further expressed as a set of symbols. $\alpha$ is an element of values, and the term "value" is understood to mean the inclusion of "$\perp$" or ptr($\tau$). The term "$\perp$" is used in metalogic to mean falsehood, but in this instance, the term "$\perp$" means the inclusion of an initial value or a value that is not a pointer. The term ptr($\tau$), in predicate calculus, means the inclusion a pointed-to location of $\tau$ where $\tau$ is a location of a pointer variable, and therefore, $\alpha$ may contain an address of another location.

The following relational logic expression defines the conditions for a valid less-than-or-equal-to relationship in determining whether the program is well typed or correctly typed:

$$ptr(\phi, \alpha) \leq ptr(\phi', \alpha) \Leftrightarrow \phi \subseteq \phi'$$

For illustrative purposes only, the term "ptr(($\phi$, $\alpha$))" means a pointed-to location that has $\phi$ and $\alpha$. The term "ptr(($\phi'$, $\alpha$))" means a pointed-to location that has $\phi'$ and $\alpha$. The logic expression includes the following meaning: Two pointed-to locations would satisfy the relational expression if and only if the $\phi$ of one pointed-to location is a subset of the $\phi'$ of the other pointed-to location, and that each pointed-to location's $\alpha$ is unified.

The determination of whether a program is well typed or correctly typed under a pointer analysis for the assignment statement "x=y" includes the following type inference rule:

$$\frac{A \vdash x: (\varphi, \alpha) \quad A \vdash y: (\varphi', \alpha') \quad \alpha' \leq \alpha}{A \vdash welltyped(x = y)}$$

This type inference rule includes the following meaning. The expression "$A \vdash$ well typed(x=y)" indicates that given all the knowledge one has so far (A), a program is well typed for the assignment statement "x=y" if all the expressions above the bar hold true. First, x is a variable that is associated with $\phi$ and $\alpha$. Second, y is a variable that is associated with $\phi'$ and $\alpha'$. And third, $\alpha'$ must be less than or equal to $\alpha$. In order for $\alpha'$ and $\alpha$ to be in condition for a valid less-than-or-equal-to relationship, the relational logic expression discussed hereinbefore is applied to the statement α'≦α. Accordingly, since α' is associated with the variable y and it is on the left side of the symbol "≦", the pointed-to location of the variable y is compared to the pointed-to location of the variable x. Therefore, the φ of the pointed-to location of y is adapted to be a subset of the φ of the pointed-to location of x, and the α of the pointed-to location of y is adapted to be unified with the α of the pointed-to location of x.

Figure 4A:
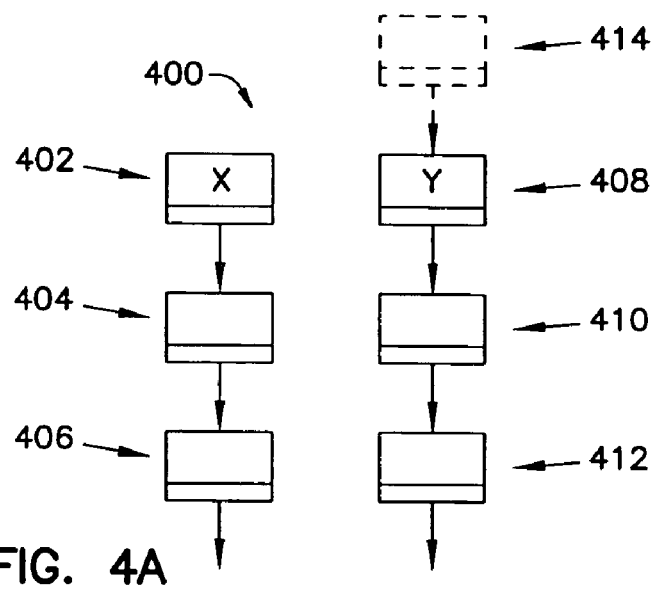
FIGS. 4A-4C illustrate a block diagram of a graph according to one aspect of the present invention.
Figure 4B:
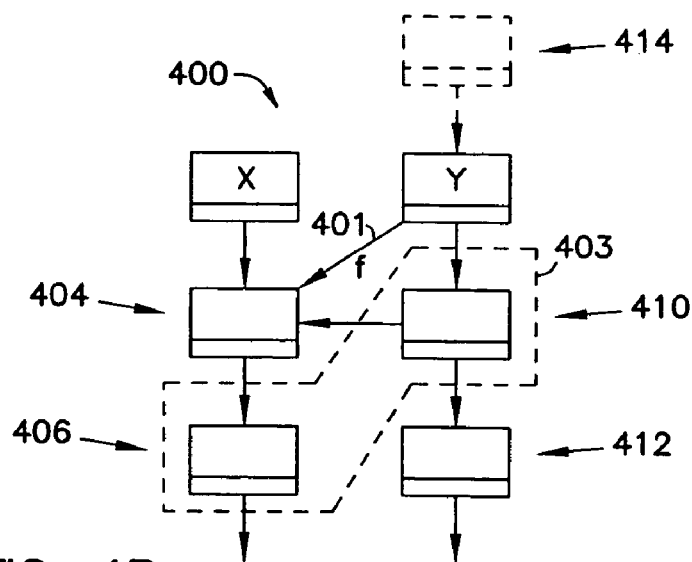
Figure 4C:
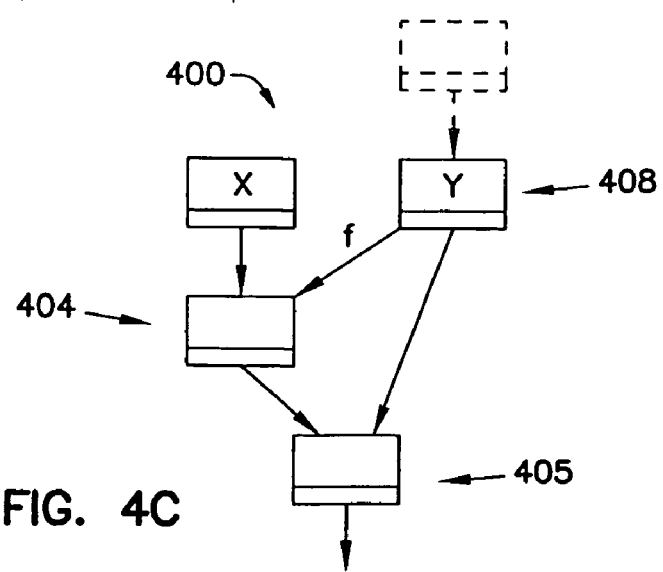

FIGS. 4A-4C illustrate a block diagram of a graph according to one aspect of the present invention. FIGS. 4A-4C contain elements similar to those discussed in FIGS. 2A-2C. These elements appear in FIGS. 4A-4C with the last two digits of the numerical nomenclature matching those in FIGS. 2A-2C. For clarity purposes, the hereinbefore discussion related to these elements is incorporated here in full.

FIG. 4A shows a graph following the next sequence of processing. The graph 400 includes elements similar to those in FIG. 2A. The graph 400 also includes a ghost of a node 414 whose content includes the address of the variable y. The purpose of the node 414 is to aid the discussion to follow.

FIG. 4B shows a graph following the next sequence of processing. For illustrative purposes only, suppose an assignment statement defines "x=&y" in the program. The symbol "&" is understood to mean the inclusion of a unary operator in a programming language to obtain an address of a variable. Thus, for illustrative purposes only, the expression "&y" can be thought to be equivalent to a pointer to the variable y since this pointer would contain an address of the variable y. The pointer is illustratively shown as node 414. In one embodiment, such an assignment statement creates a relationship between a pointed-to location of the variable x and the variable y. In one embodiment, the relationship defines that the label of the location of the variable y is a subset of the label of the pointed-to location of the variable x. This subset is the information that can be selectively retained to achieve the desired analytical precision.

A line 401 shows the relationship between the node 408 and the node 404. The direction of the line 401 as shown by the arrowhead indicates that the label of the node 408 is a subset of the label of the node 404. In one embodiment, since the node 404 and the node 408 are in different levels of indirection, the line 401 defines a label relationship that is at different levels of indirection. The marquee 403 shows that the selective unification occurs between nodes 410 and 406.

FIG. 4C shows a graph following the next sequence of processing. The graph 400, after the process of unification, shows a node 405. The node 405 appears as a pointed-to location for the nodes 408 and 404.

Figure 5:
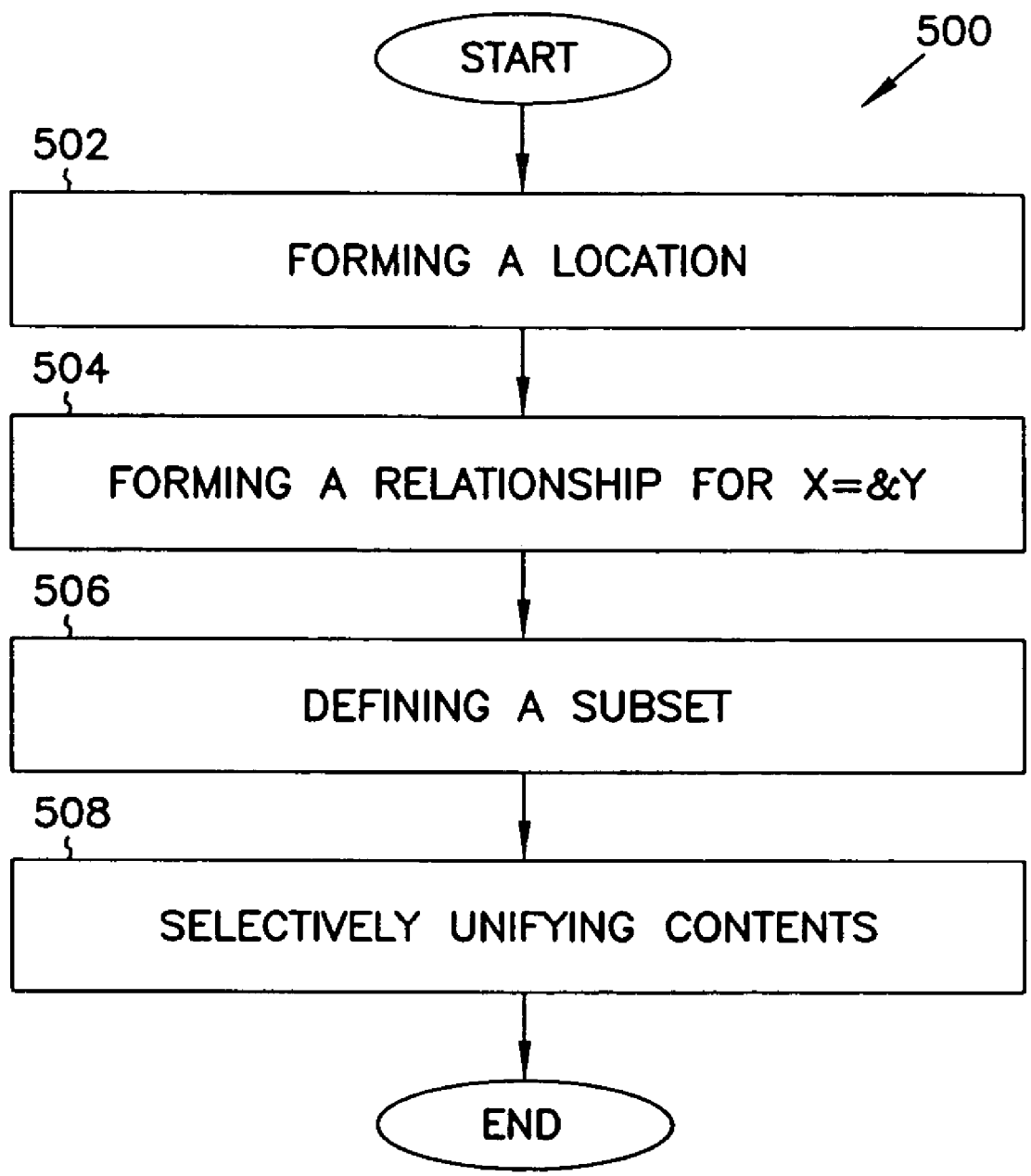
FIG. 5 is a process diagram of a method according to one aspect of the present invention.

FIG. 5 is a process diagram of a method according to one aspect of the present invention. FIG. 5 contains acts similar to those discussed in FIG. 3. These acts appear in FIG. 5 with the last two digits of the numerical nomenclature matching those in FIG. 3. For clarity purposes, the hereinbefore discussion related to these acts is incorporated here in full.

For illustrative purposes only, suppose that the assignment defines "x=&y". The act 504 includes an act 506 for defining that a label of one of the two locations is a subset of a label of the other of the two locations. If x is a pointer variable and y is a variable, then the act 506 defines that the label of the location of the variable y is a subset of the label of the pointed-to location of the variable x.

In another embodiment, the method 500 may be considered as a process for determining whether a program is well typed or correctly typed under a pointer analysis. The domain of the determination is similar to those discussed hereinbefore in FIG. 3, and that domain is incorporated here in full. The hereinbefore discussion of the relational logic expression for defining the conditions for a valid less-than-or-equal-to relationship is also incorporated here in full.

The determination of whether a program is well typed or correctly typed under a pointer analysis for the assignment statement "x=&y" includes the following type inference rule:

$$\frac{A \vdash x: (\varphi, \alpha) \qquad A \vdash y: \tau \qquad ptr(\tau) \le \alpha}{A \vdash welltyped(x = \& y)}$$

This type inference rule includes the following meaning. The expression "A ⊢ well typed(x=&y)" indicates that given all the knowledge one has so far (A), a program is well typed for the assignment statement "x=&y" if all the expressions above the bar hold true. First, x is a variable that is associated with φ and α. Second, y is a variable that is associated with τ. And third, ptr(τ) must be less than or equal to α; in other words, the pointer to a location of τ must be less than or equal to α. In order for ptr(τ) and α to be in condition for a valid less-than-or-equal-to relationship, the relational logic expression discussed hereinbefore is applied to the statement ptr(τ) ≦α. Accordingly, since τ is a location associated with the variable y and since ptr(τ) has already satisfied the relational logic expression on the left side of the symbol "≦", the location of the variable y is compared to the pointed-to location of the variable x. Therefore, the φ of the location of the variable y is adapted to be a subset of the φ of the pointed-to location of x, and the α of the location of the variable y is adapted to be unified with the α of the pointed-to location of x.

Figure 6A:
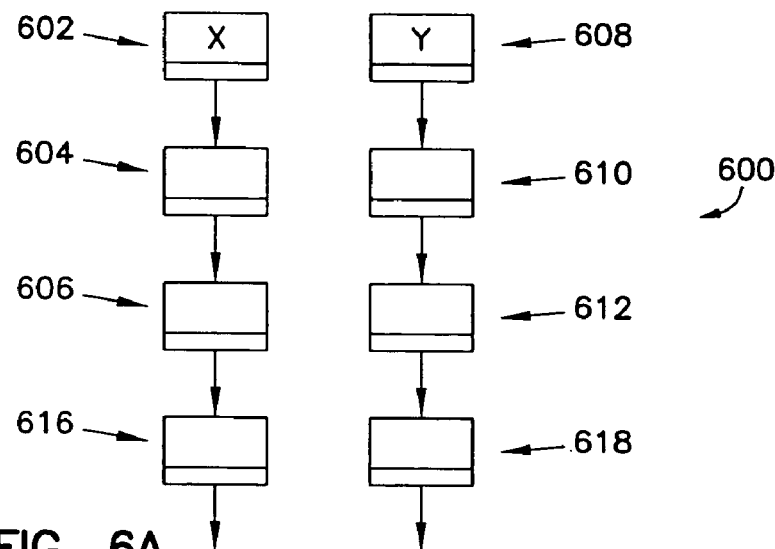
FIGS. 6A-6C illustrate a block diagram of a graph according to one aspect of the present invention.
Figure 6B:
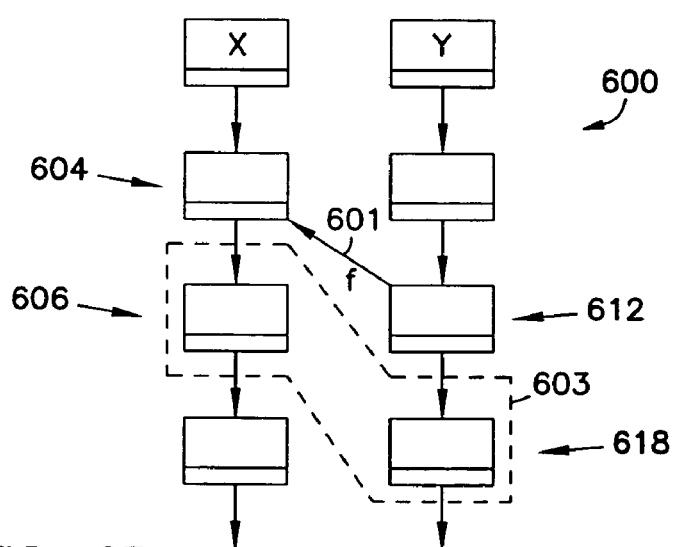
Figure 6C:
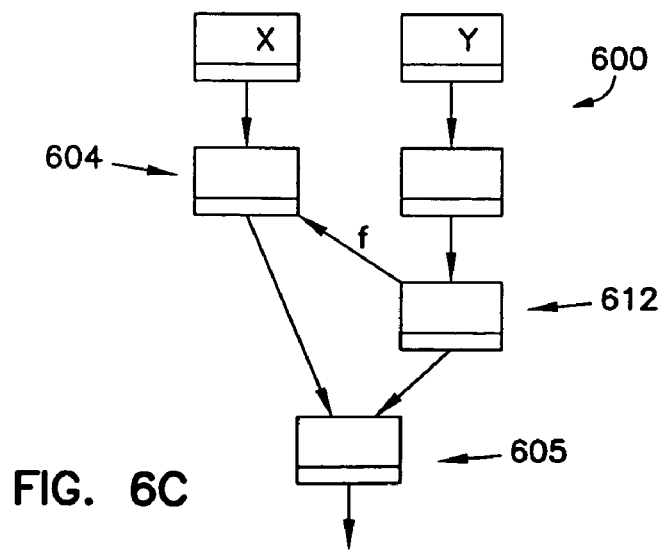

FIGS. 6A-6C illustrate a block diagram of a graph according to one aspect of the present invention. FIGS. 6A-6C contain elements similar to those discussed in FIGS. 2A-2C. These elements appear in FIGS. 6A-6C with the last two digits of the numerical nomenclature matching those in FIGS. 2A-2C. For clarity purposes, the hereinbefore discussion related to these elements is incorporated here in full.

FIG. 6A shows a graph following the next sequence of processing. The graph 600 includes nodes 616 and 618. Node 616 is a pointed-to location of the node 606. Node 618 is a pointed-to location of the node 612.

FIG. 6B shows a graph following the next sequence of processing. For illustrative purposes only, suppose an assignment statement defines "x=*y" in the program. The symbol "*" is understood to mean the inclusion of a unary operator in a programming language to dereference a pointer variable. Thus, for illustrative purposes only, the expression "*y" can be thought to be equivalent to a pointed-to location of the variable y. In one embodiment, such an assignment statement creates a relationship between a pointed-to location of the variable x and a pointed-to location of a pointed-to location of the variable y. In one embodiment, the relationship defines that the label of the pointed-to location of the pointed-to location of the variable y is a subset of the label of the pointed-to location of the variable x. This subset is the information that can be selectively retained to achieve the desired analytical precision.

A line 601 shows the relationship between the node 612 and the node 604. The direction of the line 601 as shown by the arrowhead indicates that the label of the node 612 is a subset of the label of the node 604. In one embodiment, since the node 612 and the node 604 are in different levels of indirection, the line 601 defines a label relationship that is at different levels of indirection. The marquee 603 shows that the selective unification occurs between nodes 618 and 606.

FIG. 6C shows a graph following the next sequence of processing. The graph 600, after the process of unification, shows a node 605. The node 605 appears as a pointed-to location for the nodes 612 and 604.

Figure 7:
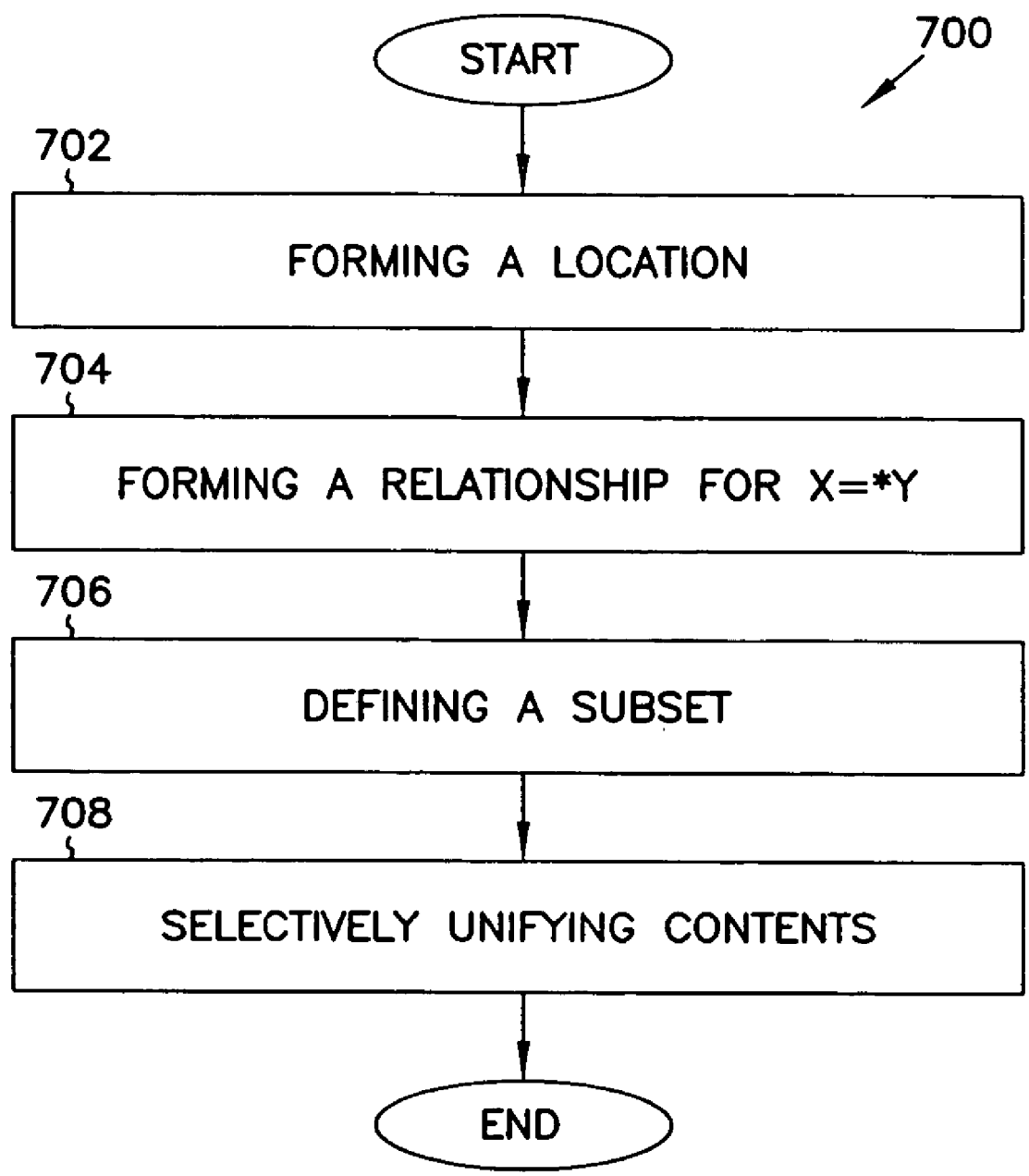
FIG. 7 is a process diagram of a method according to one aspect of the present invention.

FIG. 7 is a process diagram of a method according to one aspect of the present invention. FIG. 7 contains acts similar to those discussed in FIG. 3. These acts appear in FIG. 7 with the last two digits of the numerical nomenclature matching those in FIG. 3. For clarity purposes, the hereinbefore discussion related to these acts is incorporated here in full.

For illustrative purposes only, suppose that the assignment defines "x=*y". The act 704 includes an act 706 for defining that a label of one of the two locations is a subset of a label of the other of the two locations. If x and y are pointer variables, then the act 706 defines that the label of the pointed-to location of the pointed-to location of the variable y is a subset of the label of the pointed-to location of the variable x.

In another embodiment, the method 700 may be considered as a process for determining whether a program is well typed or correctly typed under a pointer analysis. The domain of the determination is similar to those discussed hereinbefore in FIG. 3, and that domain is incorporated here in full. The hereinbefore discussion of the relational logic expression for defining the conditions for a valid less-than-or-equal-to relationship is also incorporated here in full.

The determination of whether a program is well typed or correctly typed under a pointer analysis for the assignment statement "x=*y" includes the following type inference rule:

$$\frac{A \vdash x: (\varphi, \alpha) \\ A \vdash y: (\varphi', ptr(\tau)) \\ \tau = (\varphi'', \alpha'') \\ \alpha'' \leq \alpha}{A \vdash welltyped(x = {}^*y)}$$

This type inference rule includes the following meaning. The expression "A ⊢ well typed(x=*y)" indicates that given all the knowledge one has so far (A), a program is well typed for the assignment statement "x=*y" if all the expressions above the bar hold true. First, x is a variable that is associated with φ and α. Second, y is a variable that is associated with φ' and ptr(τ). Third, τ is a location with φ" and α". Fourth, α" must be less than or equal to α. In order for α" and α to be in condition for a valid less-than-or-equal-to relationship, the relational logic expression discussed hereinbefore is applied to the statement α"≦α. Accordingly, since α" is associated with τ, since τ is a pointed-to location of the variable y, the pointed-to location of the pointed-to location of the variable y is compared with the pointed-to location of the variable x. Therefore, the φ of a pointed-to location of the pointed-to location of the variable y must be a subset of the φ of the pointed-to location of x, and the α of a pointed-to location of a pointed-to location of the variable y must be unified with the α of the pointed-to location of x.

Figure 8A:
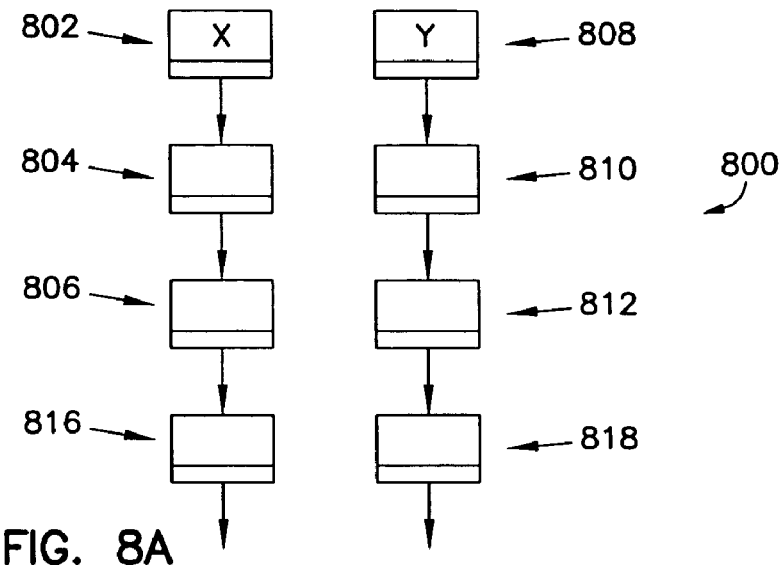
FIGS. 8A-8C illustrate a block diagram of a graph according to one aspect of the present invention.
Figure 8B:
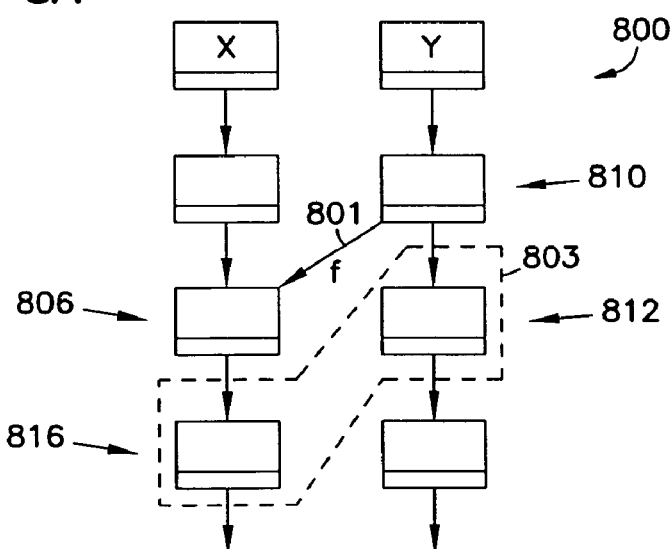
Figure 8C:
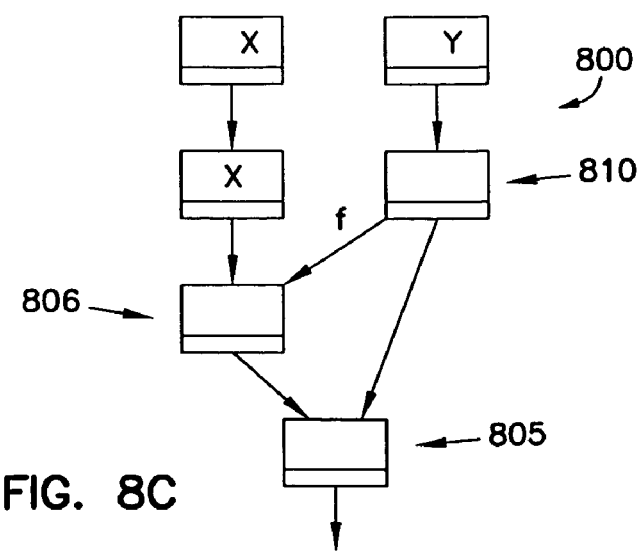

FIGS. 8A-8C illustrate a block diagram of a graph according to one aspect of the present invention. FIGS. 8A-8C contain elements similar to those discussed in FIGS. 6A-6C. These elements appear in FIGS. 8A-8C with the last two digits of the numerical nomenclature matching those in FIGS. 6A-6C. For clarity purposes, the hereinbefore discussion related to these elements is incorporated here in full.

FIG. 8A shows a graph following the next sequence of processing. The graph 800 includes nodes 816 and 818. Node 816 is a pointed-to location of the node 806. Node 818 is a pointed-to location of the node 812.

FIG. 8B shows a graph following the next sequence of processing. For illustrative purposes only, suppose an assignment statement defines "*x=y" in the program. Thus, for illustrative purposes only, the expression "*x" can be thought to be equivalent to a pointed-to location of the variable x. In one embodiment, such an assignment statement creates a relationship between a pointed-to location of a pointed-to location of the variable x and a pointed-to location of the variable y. In one embodiment, the relationship defines that the label of the pointed-to location of the variable y is a subset of the label of the pointed-to location of the pointed-to location of the variable x. This subset is the information that can be selectively retained to achieve the desired analytical precision.

A line 801 shows the relationship between the node 810 and the node 806. The direction of the line 801 as shown by the arrowhead indicates that the label of the node 810 is a subset of the label of the node 806. In one embodiment, since the node 810 and the node 806 are in different levels of indirection, the line 801 defines a label relationship that is at different levels of indirection. The marquee 803 shows that the selective unification occurs between nodes 812 and 816.

FIG. 8C shows a graph following the next sequence of processing. The graph 800, after the process of unification, shows a node 805. The node 805 appears as a pointed-to location for the nodes 810 and 806.

Figure 9:
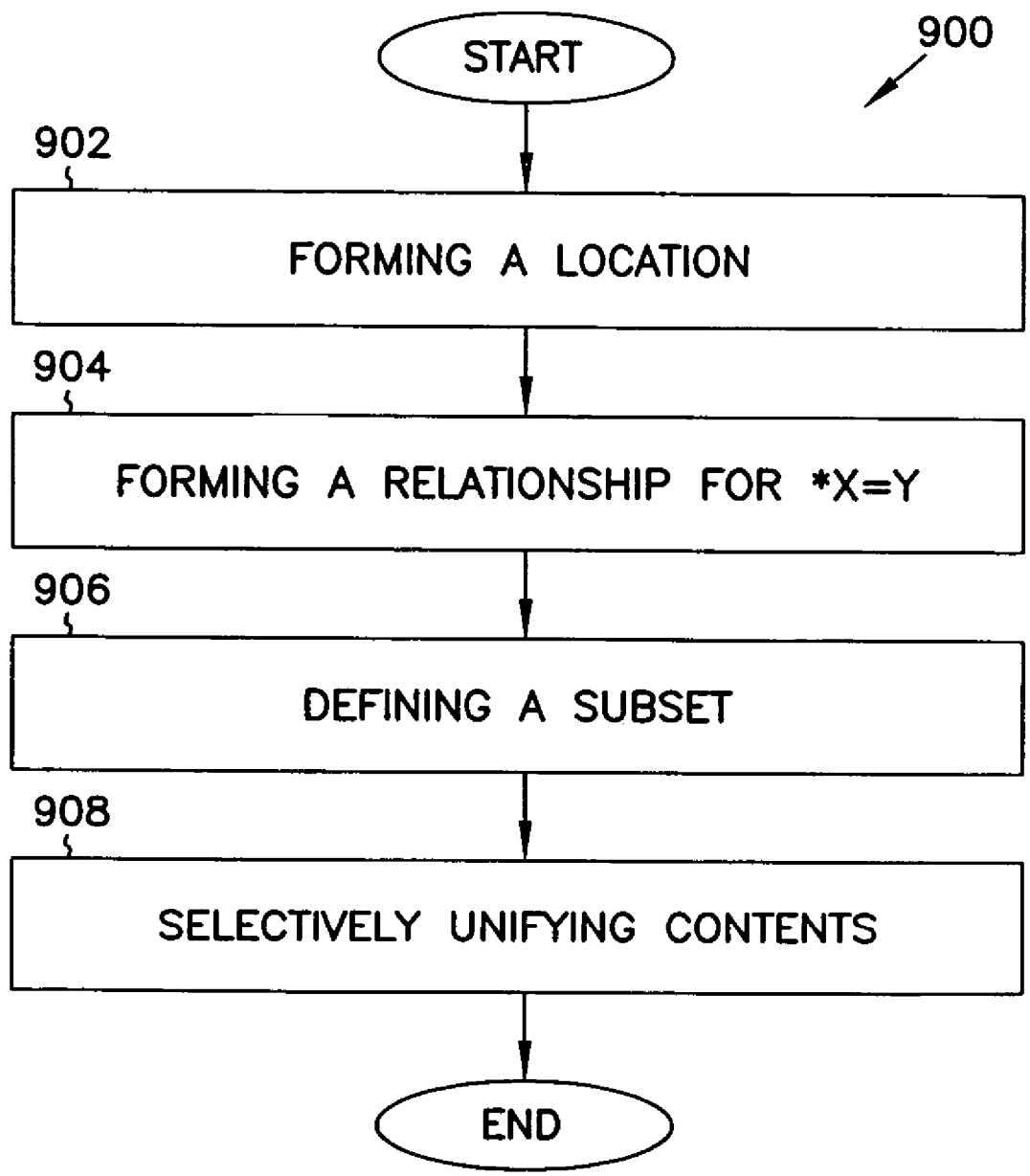
FIG. 9 is a process diagram of a method according to one aspect of the present invention.

FIG. 9 is a process diagram of a method according to one aspect of the present invention. FIG. 9 contains acts similar to those discussed in FIG. 7. These acts appear in FIG. 9 with the last two digits of the numerical nomenclature matching those in FIG. 7. For clarity purposes, the hereinbefore discussion related to these acts is incorporated here in full.

For illustrative purposes only, suppose that the assignment defines "*x=y". The act 904 includes an act 906 for defining that a label of one of the two locations is a subset of a label of the other of the two locations. If x and y are pointer variables, then the act 906 defines that the label of the pointed-to location of the variable y is a subset of the label of the pointed-to location of the pointed-to location of the variable x.

In another embodiment, the method 900 may be considered as a process for determining whether a program is well typed or correctly typed under a pointer analysis. The domain of the determination is similar to those discussed hereinbefore in FIG. 3, and that domain is incorporated here in full. The hereinbefore discussion of the relational logic expression for defining the conditions for a valid less-than-or-equal-to relationship is also incorporated here in full.

The determination of whether a program is well typed or correctly typed under a pointer analysis for the assignment statement "*x=y" includes the following type inference rule:

$$\frac{A \vdash x: (\varphi', ptr(\tau)) \\ A \vdash y: (\varphi, \alpha) \\ \tau = (\varphi'', \alpha'') \\ \alpha \leq \alpha''}{A \vdash welltyped({}^*x = y)}$$

This type inference rule includes the following meaning. The expression "A ⊢ well typed(*x=y)" indicates that given all the knowledge one has so far (A), a program is well typed for the assignment statement "*x=y" if all the expressions above the bar hold true. First, x is a variable that is associated with φ' and ptr(τ). Second, y is a variable that is associated with φ and α. Third, τ is a location with φ" and α". Fourth, α must be less than or equal to α". In order for α and α" to be in condition for a valid less-than-or-equal-to relationship, the relational logic expression discussed hereinbefore is applied to the statement α≦α". Accordingly, since α is associated with the variable y, the pointed-to location of the variable y is compared with the pointed-to location of the pointed-to location of the variable x. Therefore, the φ of the pointed-to location of the variable y must be a subset of the φ of the pointed-to location of the pointed-to location of the variable x, and the α of a pointed-to location of the variable y must be unified with the α of the pointed-to location of the pointed-to location of the variable x.

In the discussion hereinbefore and hereinafter, the act of making a label of a location a subset of a label of another location includes an act of propagating the label from one location to another location such that the subset is formed. In one embodiment, that act of propagating is delayed for a predetermined period of time so as to allow the processing of each assignment statement in a program.

Figure 10:
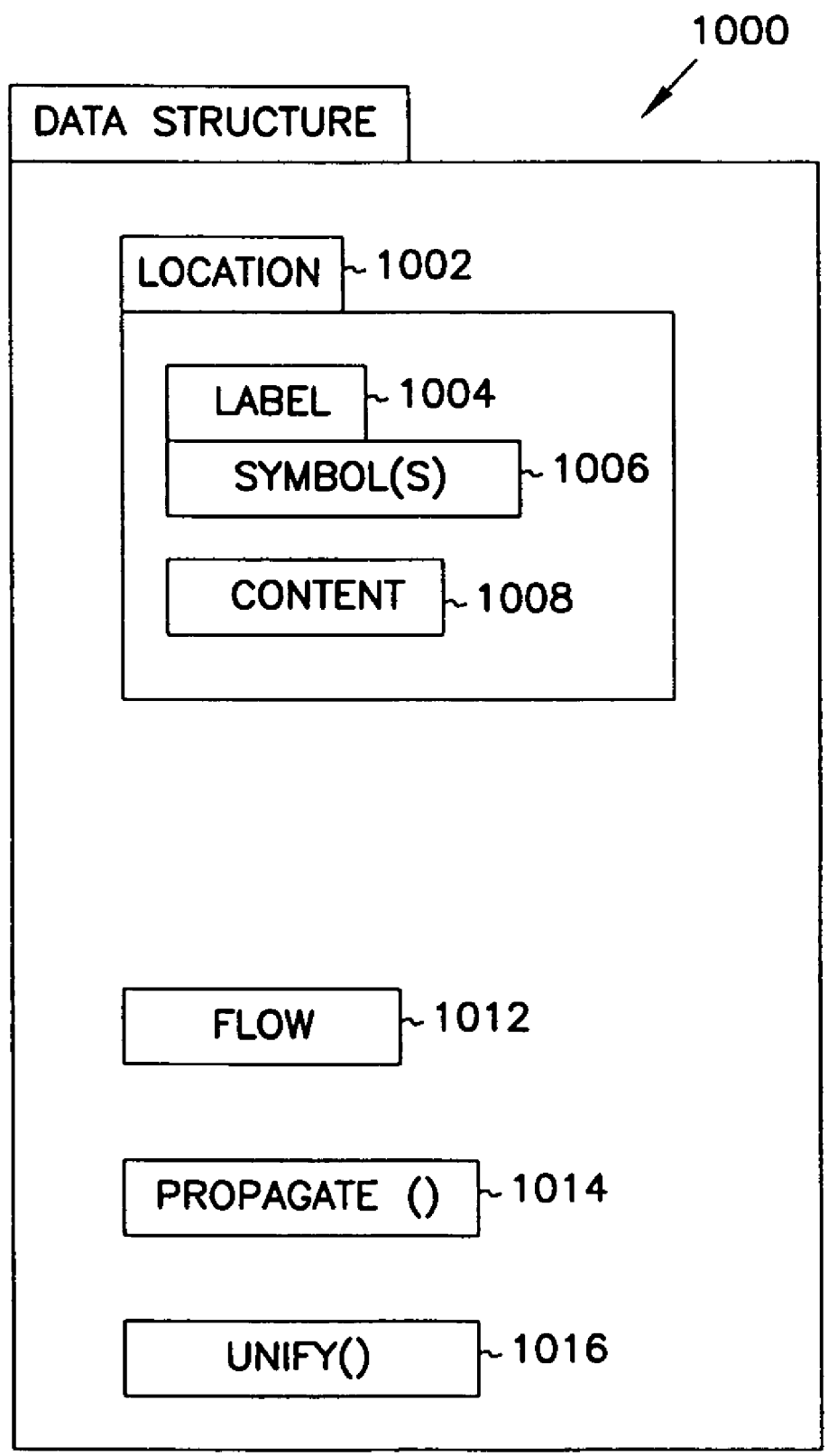
FIG. 10 is a structure diagram of a data structure according to one aspect of the present invention.

FIG. 10 is a structure diagram of a data structure according to one aspect of the present invention. A data structure 1000 includes a data member location 1002. The data member location 1002 includes one data member label 1004. The data member label 1004 includes at least one data member symbol that represents a name of a variable. The data member location 1002 also includes a data member content 1008. The data member content 1008 represents a content of a variable or a unification of at least two variables.

The data structure 1000 includes a data member flow 1012. The data member flow 1012 represents at least one label relationship between two instantiations of the data structure. In one embodiment, the data member flow 1012 stores an address of an instantiation of the data structure 1000 if an assignment statement is defined for two variables, and the instantiation is related to one of the two variables.

The data structure 1000 optionally includes a method member propagate 1014. In one embodiment, the method member propagate causes a propagation of at least one data member symbol 1006 so as to make the data member label 1004 of one instantiation of the data structure 1000 a subset of a data member label 1004 of another instantiation of the data structure 1000. The data structure 1000 also optionally includes a method member unify 1016. In one embodiment, the method member unify 1016 merges a data member label 1004 of one instantiation of the data structure 1000 with a data member label 1004 of another instantiation of the data structure 1000, and unifies a data member content 1008 of one instantiation of the data structure 1000 with a data member content 1008 of another instantiation of the data structure 1000.

Figure 11:
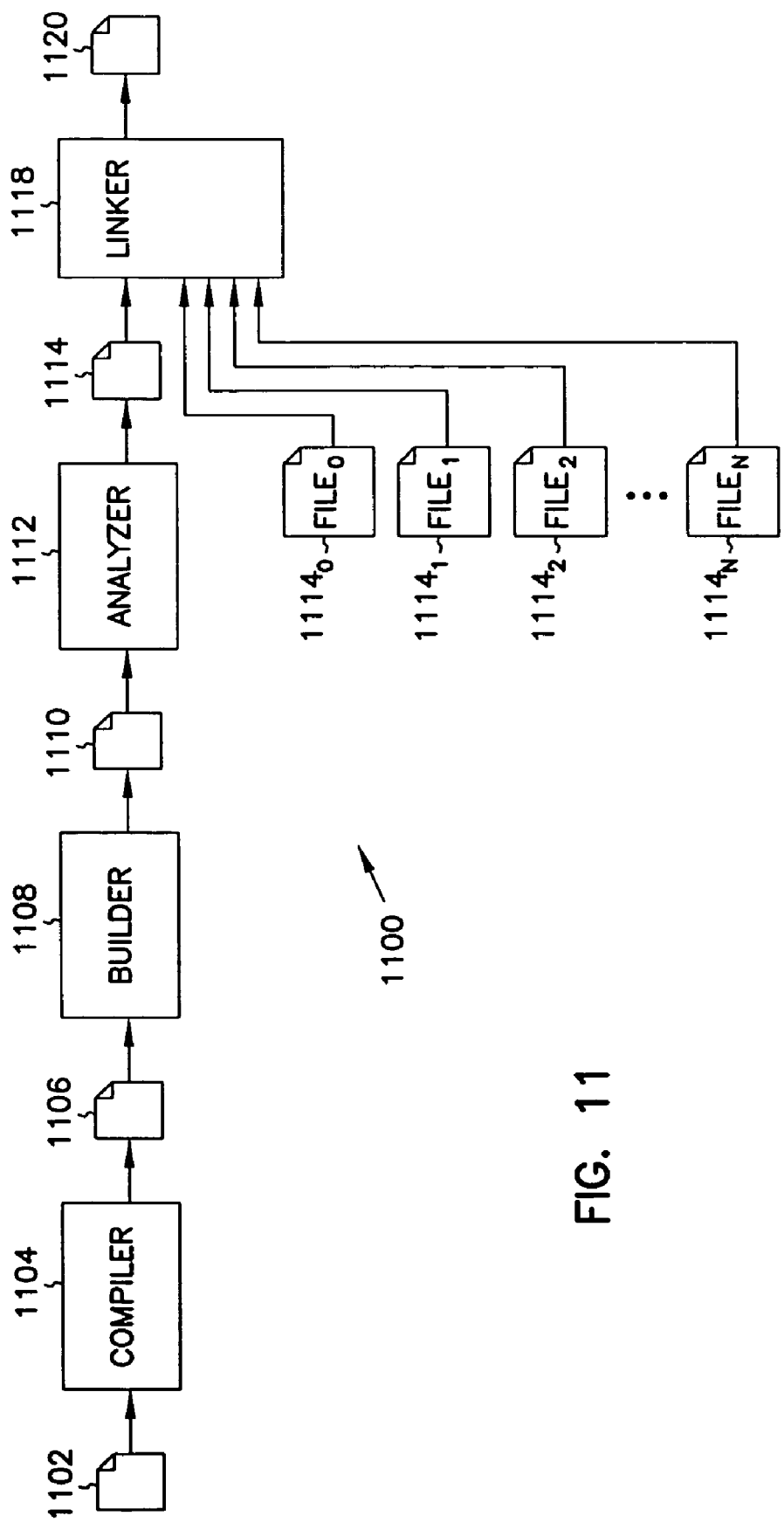
FIG. 11 is a block diagram of a system according to one aspect of the present invention.

FIG. 11 is a block diagram of a system according to one aspect of the present invention. System 1100 includes a source file 1102. The source file 1102 contains a program or a portion of a program. In the embodiment where the source file 1102 contains only a portion of the program, other portions of the program are distributed in other source files (not shown).

System 1100 includes a compiler 1104. In one embodiment, the compiler 1104 includes any one of the compilers available in Visual Studio Suite®, a product of Microsoft® Corporation. In a further embodiment, the compiler 1104 includes a C language compiler.

In system 1100, a source file 1102 that contains a program or portions of a program is input into the compiler 1104. The compiler 1104 translates the statements of the source file 1102 into an equivalent set of statements in a file 1106 that is in an intermediate language. The file 1106 is input into a builder 1108. The builder 1108 builds a tree 1110 that is a representation of the set of statements of file 1106. This tree 1110 contains grammatical phrases of statements in the file 1106. In one embodiment, this tree 1110 is an abstract syntax tree (hereinafter, AST).

The tree 1110 is then input into an analyzer 1112. The analyzer 1112 analyzes the tree 1110 and produces an object file 1114. The object file 1114 contains information for the source file 1102. In one embodiment, the object file 1114 contains at least one relationship between two variables in an assignment statement in the source file 1102.

The system 1100 includes a linker 1118. The object file 1114 and other object files that were generated previously such as object files $1114_0$, $1114_1$, $1114_2$, ..., and $1114_N$ are input into the linker 1118. The linker 1118 links the pointer information in each of the object files together and produces pointer information for object files 1114, $1114_0$, $1114_1$, $1114_2$, ..., and $1114_N$. If the original source files of these object files constitute a program, then the linker 1118 produces information for the entire program. In one embodiment, the linker 1118 produces information for pointer analysis for the entire program.

CONCLUSION

Methods have been described to enhance pointer analysis for programs. Such enhancement allows tools such as program optimizers, error detection tools, and user feedback tools to make superior assumptions about programs under analysis. One result from such enhancement includes software products that may run faster, contain fewer bugs, or both. These methods allow a pointer analysis to scale well to large programs while providing a desired level of analytical precision within a desired duration of analysis.

Although the specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. It is to be understood that the above description is intended to be illustrative, and not restrictive. Combinations of the above embodiments and other embodiments will be apparent to those of skill in the art upon reviewing the above description. The scope of the invention includes any other applications in which the above structures and fabrication methods are used. Accordingly, the scope of the invention should only be determined with reference to the appended claims, along with the full scope of equivalents to which such claims are entitled.

I claim:

1. A method of graphing variables in a program, the method comprising:
    displaying a plurality of nodes, wherein each node of the plurality of nodes represent at least one variable;
    displaying a plurality of lines, wherein at least one line of the plurality of lines represents a pointer relationship between two nodes; and
    emanating a flow line from one node of the plurality of nodes to another node of the plurality of nodes so as to create a relationship between the one node and the another node in response to processing an assignment statement between two variables in the program; wherein processing the assignment statement includes forming a relationship between two locations that are related to the two variables, wherein the two locations are selected to be one level of indirection away from a level associated with the assignment statement, wherein each location includes a label and a content; and selectively unifying the content of the first one of the two locations with the content of the second one of the two locations.

2. The method of claim 1, wherein displaying a plurality of lines includes display only one line that emanates from one node of the plurality of nodes.

3. The method of claim 1, wherein emanating a flow line includes emanating only one flow line from one node of the plurality of nodes.

4. A computer readable medium having instructions stored thereon for causing a computer to perform a method of graphing variables in a program, the method comprising:
  displaying a plurality of nodes, wherein each node of the plurality of nodes represent at least one variable;
  displaying a plurality of lines, wherein at least one line of the plurality of lines represents a pointer relationship between two nodes; and
  emanating a flow line from one node of the plurality of nodes to another node of the plurality of nodes so as to associate the one node with the another node in response to processing an assignment statement in the program; wherein processing the assignment statement includes forming a relationship between two locations that are related to the two variables, wherein the two locations are selected to be one level of indirection away from a level associated with the assignment statement, wherein each location includes a label and a content; and selectively unifying the content of the first one of the two locations with the content of the second one of the two locations.

5. A computer-readable medium for representing a graph for enhancing pointer analysis, comprising:
  defining a plurality of nodes, wherein at least one node of the plurality of nodes represents at least one variable;
  defining a plurality of lines, wherein at least one line of the plurality of lines represents a pointer relationship between at least two nodes of the plurality of nodes; and
  defining at least one flow line, wherein the at least one flow line represents a label relationship between one node of the plurality of nodes and another node of the plurality of nodes; wherein the at least one flow line is defined in response to processing an assignment statement between two variables in a program; wherein processing the assignment statement includes forming a relationship between two locations that are related to the two variables, wherein the two locations are selected to be one level of indirection away from a level associated with the assignment statement, wherein each location includes a label and a content; and selectively unifying the content of the first one of the two locations with the content of the second one of the two locations.

6. The computer-readable storage medium of claim 5, wherein the variable is adapted to be a pointer type through a process that is selected from a group consisting of declaring through a set of predefined data types, type conversion, and type casting.

7. The computer-readable storage medium of claim 5, wherein only one line of the plurality of lines emanates from a node of the plurality of nodes.

8. The computer-readable storage medium of claim 5, wherein only one flow line emanates from a node of the plurality of nodes.

9. The computer-readable storage medium of claim 5, wherein the at least one flow line emanates from the one node of the plurality of nodes to the another node of the plurality of nodes so as to represent that a label of a location of the one node of the plurality of nodes is a subset of a label of a location of the another node of the plurality of nodes.

10. The computer-readable storage medium of claim 5, wherein at least two nodes of the plurality of nodes are selectively unified.

11. A computer-readable storage medium that includes a data structure to enhance pointer analysis in a program, wherein the program includes at least one assignment statement of variables, wherein each variable includes a name and a content, comprising:
  processing the assignment statement between the variables in the program, wherein processing the assignment statement includes forming a relationship between two locations that are related to the variables, wherein the two locations are selected to be one level of indirection away from a level associated with the assignment statement, wherein each location includes a label and a content, selectively unifying the content of the first one of the two locations with the content of the second one of the two locations; and wherein the data structure includes
  a data member location; and
  a data member flow to represent at least one label relationship.

12. The computer-readable storage medium of claim 11, wherein the data member location includes:
  a data member label, wherein the data member label includes at least one data member symbol that represents a name of a variable; and
  a data member content that represents a content of the variable or a unification of at least two variables.

13. The computer-readable storage medium of claim 12, wherein the data member flow stores an address of an instantiation of the data structure if an assignment statement is defined for two variables, and wherein the instantiation is related to one of the two variables.

14. The computer-readable storage medium of claim 13, wherein the data structure includes a method member propagate, wherein the method member propagate causes a propagation of the at least one data member symbol so as to make the data member label of one instantiation of the data structure a subset of a data member label of another instantiation of the data structure.

15. The computer-readable storage medium of claim 13, wherein the data structure includes a method member unify, wherein the method member unify merges a data member label of one instantiation of the data structure with a data member label of another instantiation of the data structure, and wherein the method member unify unifies a data member content of one instantiation of the data structure with a data member content of another instantiation of the data structure.

* * * * *

UNITED STATES PATENT AND TRADEMARK OFFICE
CERTIFICATE OF CORRECTION

| | | |
|---|---|---|
| PATENT NO. | : 7,496,894 B2 | Page 1 of 1 |
| APPLICATION NO. | : 10/866941 | |
| DATED | : February 24, 2009 | |
| INVENTOR(S) | : Manuvir Das | |

It is certified that error appears in the above-identified patent and that said Letters Patent is hereby corrected as shown below:

In column 16, lines 27-28, in Claim 11, delete "content," and insert -- content; --, therefor.

Signed and Sealed this
Third Day of May, 2011

David J. Kappos
*Director of the United States Patent and Trademark Office*